Patented June 9, 1931

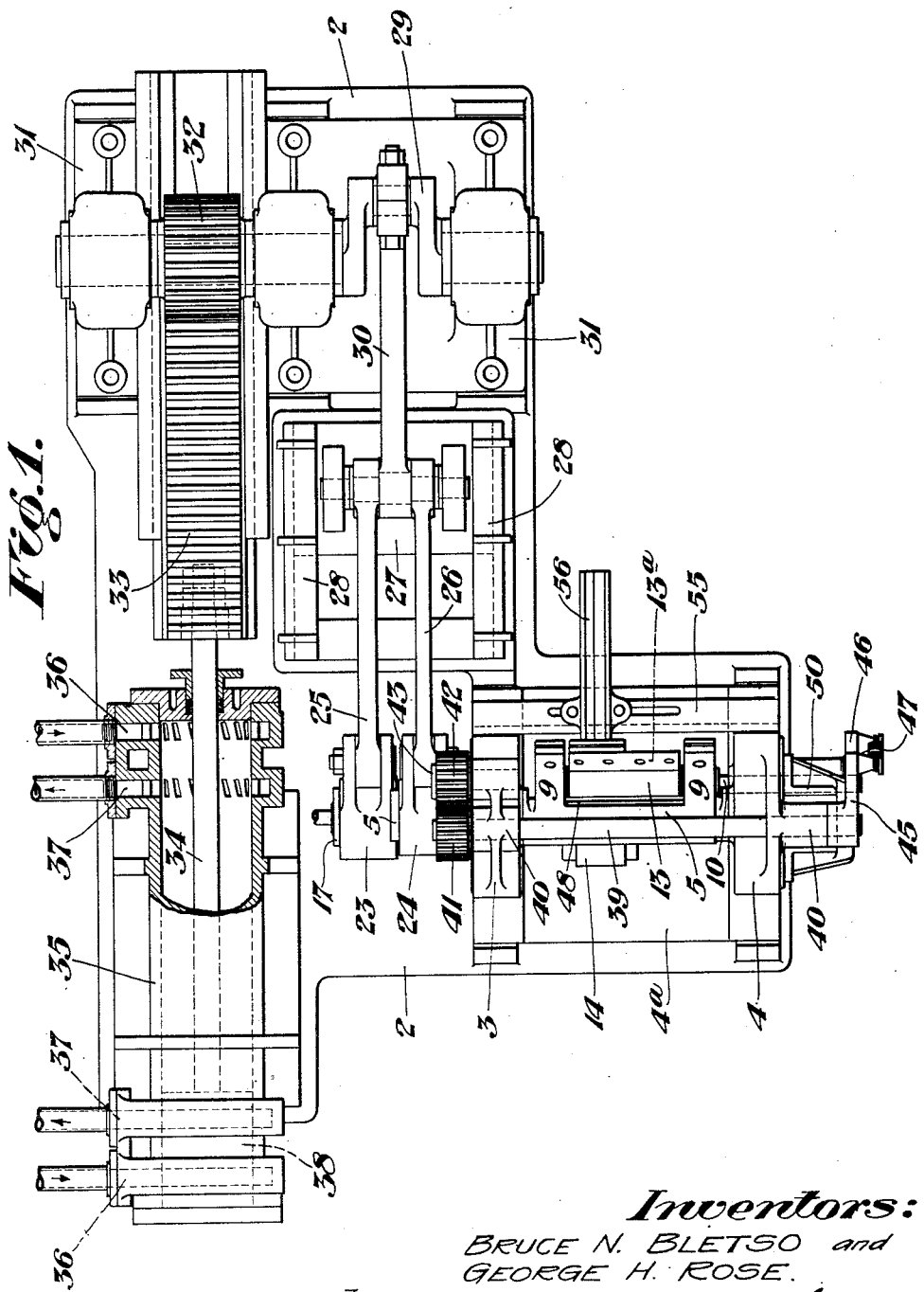

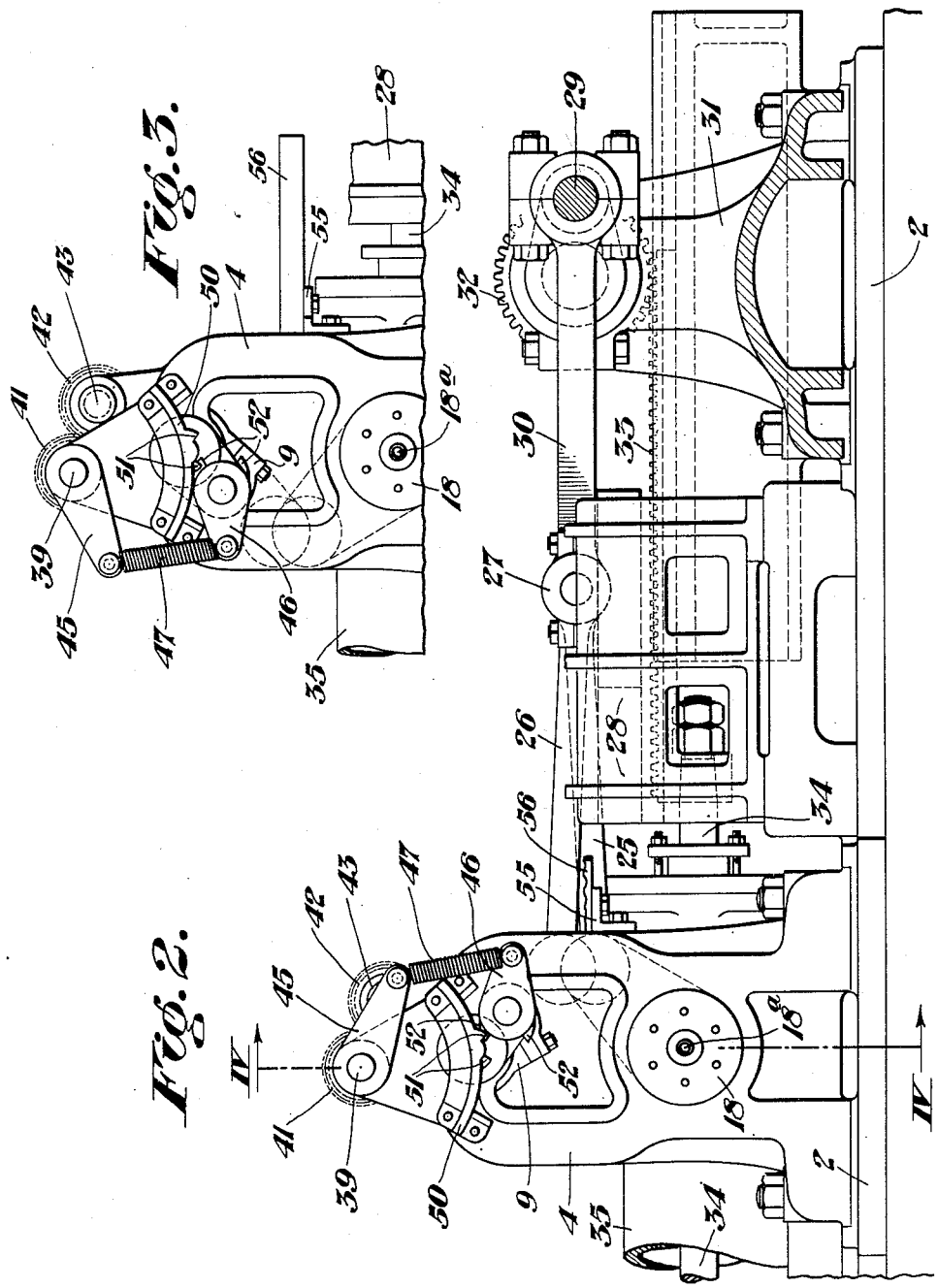

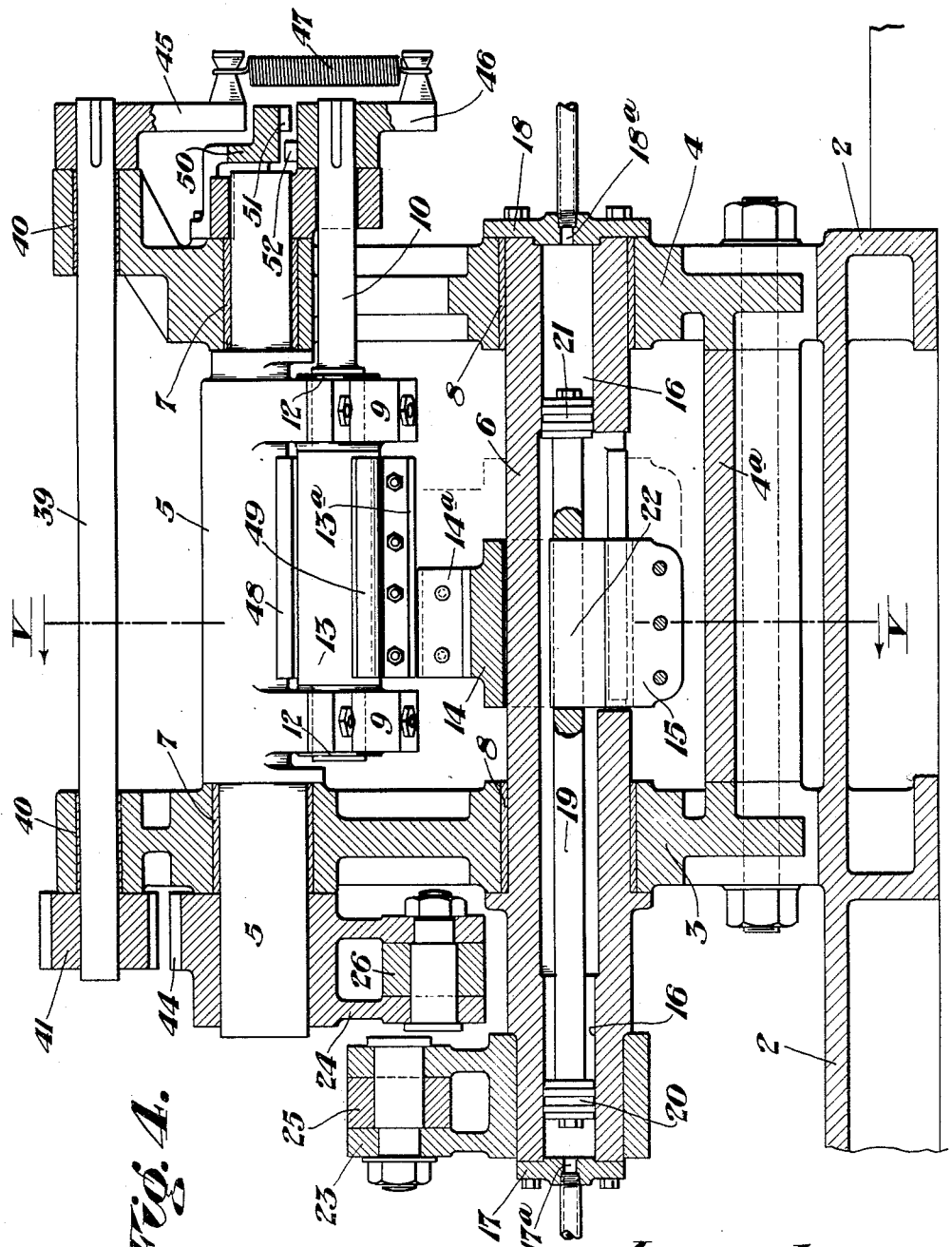

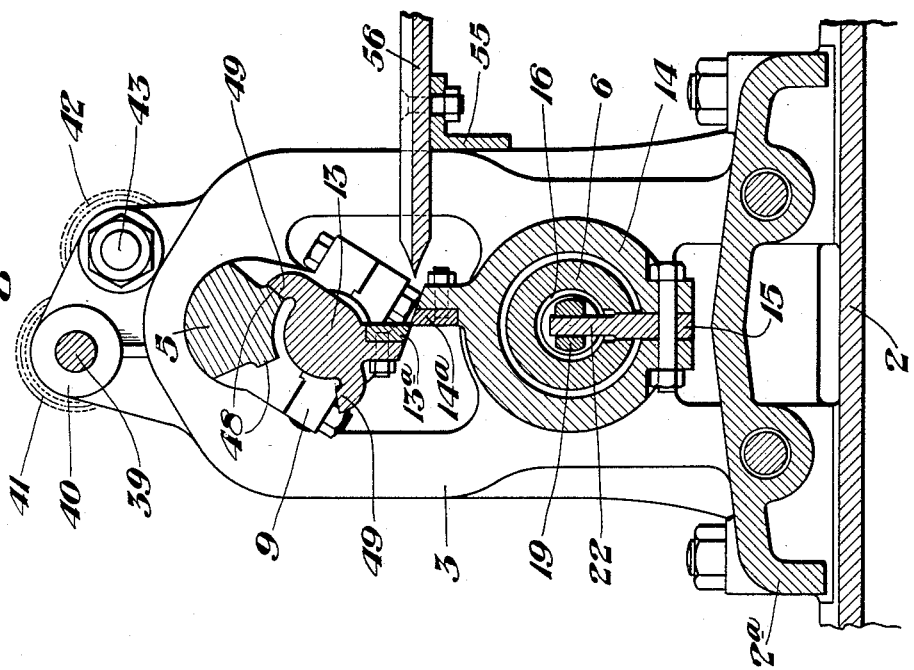
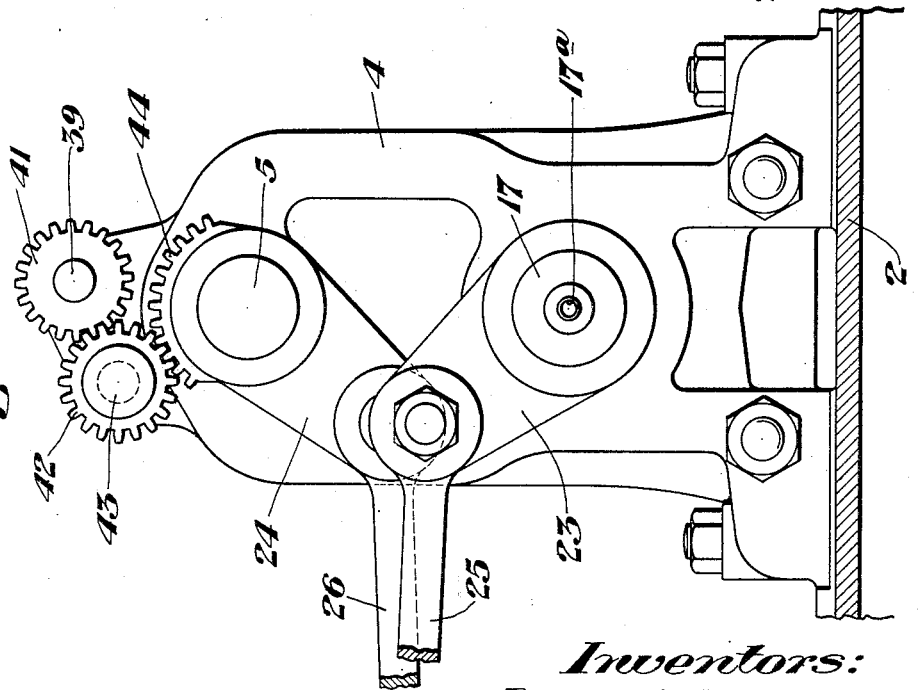

1,809,668

UNITED STATES PATENT OFFICE

BRUCE N. BLETSO, OF EAST CLEVELAND, AND GEORGE H. ROSE, OF CLEVELAND HEIGHTS, OHIO

FLYING SHEAR

Application filed October 16, 1929. Serial No. 400,066.

This invention relates to shears and more particularly to that class of shears known as "flying shears" which are shears adapted to shear metal bars, billets and the like while in motion, and has for its object the provision of a novel form of shear which will be rapid and accurate in operation, whereby a greater number of cuts can be made in a given time than with shears of the prior art.

Another object is to provide a novel operating means for the shear which is composed of few parts and is free of cams and similar parts liable to wear.

Other objects and advantages of the invention will be apparent to those skilled in the art from the following specification taken in connection with the accompanying drawings.

In the drawings—

Figure 1 is a plan of a shear constructed in accordance with our invention.

Figure 2 is a side elevation of the shear.

Figure 3 is a fragmentary side elevation showing the upper shear knife mechanism in its reversed extreme position from that of Figure 2.

Figure 4 is a sectional elevation taken on the line IV—IV of Figure 2.

Figure 5 is a sectional elevation taken on the line V—V of Figure 4.

Figure 6 is a side elevation of the housing end of the shear showing the means for operating the shear-shafts and kicker mechanism.

Referring more particularly to the drawings, the numeral 2 designates the base or bed-plate of the machine as a whole. A pair of shear housings 3 and 4 are held rigidly apart through spacer base member 4ª and securely mounted on base or bed-plate 2.

Upper and lower shear-shafts 5 and 6 are journaled in suitable bearings 7 and 8, respectively, in the housings 3 and 4.

A pair of hanger arms 9 are either formed integral or keyed to the upper shear-shaft 5, and an upper shear knife pivot shaft 10 is journaled in bearings 12 at the free ends of the arms. A shear knife body 13 is made integral with or keyed on the shaft 10 and has a blade 13ª thereon. The knife body 13 preferably is of sufficient length to extend between the arms 9.

The lower shear knife body 14 is in the form of a collar and is slidably mounted on the lower shear-shaft 6 and is held against rotation on said shaft by a key 15. A knife blade 14ª is mounted on the body 14.

The shaft 6 is provided with a central bore 16 which is closed at each end by heads 17 and 18 to form a double-acting fluid pressure cylinder. The heads 17 and 18 are provided with ports 17ª and 18ª, respectively. A double-ended piston member 19, having heads 20 and 21 at its opposite ends, is mounted in the bored shaft 6 and is connected to the lower shear knife body 14 by connecting member 22 which is formed integral with the key 15. The piston member 19 serves to propel the lower shear member in either direction along the shaft 6. By thus moving the lower shear transversely of the upper shear knife additional shearing positions may be obtained.

A lever 23 is keyed to the one end of the shaft 6 and a similar lever 24 is keyed to the shaft 5. The levers 23 and 24 have their free ends pivotally connected to one end of connecting rods 25 and 26, respectively, which have their other ends pivotally connected to a cross-head 27 which is slidably mounted in a cross head guide housing 28. Reciprocation of the cross-head 27 will cause the connecting rods to rock the shafts 5 and 6 by means of the levers 23 and 24 through a partial revolution, thus moving less than a complete revolution but sufficient to cause the shear blades to meet and sever the object to be sheared.

The cross-head 27 is connected to a suitable crank-shaft 29 by a connecting rod 30. The crank-shaft 29 is journaled in a stand 31 and may be powered by any suitable source of power. In the drawings, the crank-shaft 29 is shown provided with a gear 32 which is meshed with a rack 33. The rack 33 is connected to the end of the piston rod 34 of a fluid cylinder assembly comprising a cylinder 35, having inlet and outlet ports 36 and 37, respectively, at each end and having a piston 38 connected to the piston rod 34.

A suitable valve (not shown) is provided for controlling the fluid flow to and from said ports.

When the valve is operated, fluid is admitted into one end of the cylinder 35 through the respective inlet port 36 and propels the piston 38 and rod 34 toward the other end of the cylinder. The fluid in advance of the piston is expelled through the exhaust port at the end of the cylinder opposite from which fluid is entering, until the piston passes said exhaust port, at which time the fluid remaining in advance of said piston will be compressed, thereby cushioning and stopping the piston.

The travel of the piston 38 is communicated through the piston rod 34 to the rack 33 and thence to the gear 32 on the crank-shaft 29; the movement of the piston 38, piston rod 34 and rack 33 being sufficient to cause one complete revolution or 360 degrees rotation of the crank-shaft 29.

It will be understood that any other well known form of operating mechanism may be employed for rotating the crank-shaft 29 if desired.

A kicker operating shaft 39 is journaled in suitable bearings 40 at the upper ends of the housings 3 and 4. A gear 41 is keyed on one end of the shaft 39 and is meshed with a gear 42 mounted on a stub-shaft 43 secured in the housing 3. The gear 42 is, in turn, meshed with a segmental gear 44 which is mounted on the upper shear-shaft 5. The segmental gear 44 is shown as formed integral with the lever 24. However, it will be understood that this segmental gear may be separate if desired.

The end of the shaft 39 carried by the housing 4 projects beyond said housing and carries a lever arm 45 which is keyed thereto. A second and slightly shorter lever arm 46 is keyed to the pivot shaft 10 on which the upper shear knife is mounted. A spring 47 is secured to the free ends of the lever arms 45—46 and forms a flexible resilient connection therebetween.

The lever arms 45 and 46 are so positioned with respect to each other and so proportioned in length that as the upper shear-shaft, which carries the pivot shaft 10 and lever arm 46, approaches the end of its movement in either direction, the shaft 39 will have moved the lever arm 45 in advance of the arm 46 so as to have tensioned the spring 47. This tensioning of the spring 47 will be sufficient at approximately the end of the movement of the shear-shaft 5 to pull the lever 46 and pivot shaft 10 around so as to swing the upper shear knife about the axis of the shaft 10 in the same direction it is being moved by the shaft 5 but in a materially shorter arc.

This movement or kicking of the upper shear knife around the axis of the shaft 10 in a relatively short arc serves to decrease the distance from the fixed shear axis; that is, the axis of the shaft 5 to the shear knife edge after the knives have been moved through their cutting arc.

The upper shear-shaft is provided with stop ribs 48 adapted to be engaged by projecting stop ribs 49 on the upper shear knife body to limit the movement of the shear knife about the axis of the shaft 10.

In order to insure the kicking movement of the upper shear about the axis of the shaft 10, a bracket 50 is secured on the housing 4 and is provided with kicker lugs 51 adapted to be engaged by kicker lugs 52 positioned on opposite sides of the longitudinal axis of the lever arm 46.

After the lever arm 46 and shaft 10 have moved about the axis of the shear-shaft 5 to approximately the limit of travel and the lever arm 45 has moved about the axis of the shaft 39 to tension the spring 47, the lugs 51 will engage the lugs 52 and thus start the lever arm 46 past its dead center so that the spring 47 will snap said arm, the shaft 10 and upper shear knife about the axis of the shaft 10.

A suitable guide bar 55 and guide 56 are mounted on the entering side of the housings 3 and 4 to guide the work between the shear knives.

In operation, power is applied to rotate the crank-shaft 29 one complete revolution which, in turn, operates through the connecting rods 30, 25 and 26 and levers 23 and 24 to rotate the shear-shafts 5 and 6 back and forth through a partial revolution. The shafts 5 and 6 will then move the upper and lower shear knives 13 and 14, respectively, through an arcuate path about the axis of the shafts.

During the forward movement of the shear knives they engage the work-piece to be severed and continue their forward movement at the speed the work-piece is traveling. The edges 13ª and 14ª of the knives will come together or meet at a point on vertical and horizontal center lines between the upper and lower knives to complete the severance of the work-piece and will continue their forward movement to the forward limit of their arcs of travel.

Simultaneously with the forward movement of the upper and lower shear knives the upper end of the spring 47 has been caused to travel through a relative but greater degree of forward arc of travel, thus producing tension in said spring member and causing the center line of said spring to pass beyond the center line of the upper shear pivot shaft 10, therefore causing said shaft 10 and shear 13 to snap forward on a relatively shorter arc of travel than the arc of travel produced by the shaft 5.

This relatively short arc of travel of the upper shear knife 13 causes said knife to recede or move up to a position nearer to the axis of the shaft 5, therefore providing a clearance space between the upper and lower shearing members on the backward motion of their respective arcs of travel, thus permitting the work-piece to continue its forward travel without interference.

The backward arcuate swings of the shear knives 13 and 14 follow the completion of the forward swings.

Simultaneously with the backward movement of the shear knives 13 and 14, the upper end of the spring 47 has been caused to travel through a relative but greater degree of backward arc of travel, thus producing tension in said spring and causing its center line to pass beyond the center line of the pivot shaft 10, therefore causing the shaft 10 and upper shear knife 13 to swing backward through an arcuate path about the axis of the shaft 10, and into cutting position.

The start of the movement of the upper shear knife 13 and shaft 10 about the axis of the shaft 10 by the spring 47 in both its forward and backward directions is started by the engagement of the lugs 52 engaging the lugs 51 on the bracket 50 and thereby forcing the shaft 10 and shear knife 13 beyond their dead center positions.

In order to limit the short arc travel of the upper shear knife 13 and shaft 10, the ribs 49 on the shear knife 13 engage the stop ribs 48 on the shaft 5.

While we have shown and described one specific embodiment of our invention it will be understood that we do not wish to be limited thereto since various modifications may be made without departing from the scope of our invention, as defined in the appended claims.

We claim—

1. In a flying shear, a pair of knives each mounted to move about separate vertically spaced fixed axes, at least one of said knives being pivoted on a second axis movable about said fixed axis as said knife is moved about its fixed axis, means for moving said knives through a partial revolution alternately in opposite directions about said fixed axes, and means for automatically moving said pivoted knife about its pivoted axis in the direction it is being moved about its fixed axis adjacent the end of its movement in either direction.

2. In a flying shear a pair of knives each mounted to move about separate vertically spaced fixed axes, at least one of said knives being pivoted on a second axis movable about said fixed axis as said knife is moved about its fixed axis, means for moving said knives through a partial revolution alternately in opposite directions about said fixed axes, and means for automatically snapping said pivoted knife about its pivot axis in the direction said knife is being moved about said fixed axis adjacent the end of its movement in either direction.

3. In a flying shear a pair of knives each mounted to move about separate vertically spaced fixed axes, at least one of said knives being pivoted on a second axis movable about said fixed axis as said knife is moved about its fixed axis, means for moving said knives through a partial revolution alternately in opposite directions about said fixed axes, means for automatically snapping said pivoted knife about its pivot axis in the direction said knife is being moved about said fixed axis adjacent the end of its movement in either direction, and means for limiting the said last named movement of said knife.

4. In a flying shear, upper and lower knives each mounted to move about separate vertically spaced fixed axes, the upper one of said knives being pivoted on a second axis movable about said fixed axis as said knife is moved about said fixed axis, said upper knife being of materially greater width than said lower knife, means for moving said lower knife transversely on its fixed axis, means for moving said knives through a partial revolution alternately in opposite directions about said fixed axes, and means for automatically snapping said upper knife about its pivot axis in the direction said knife is being moved about said fixed axis adjacent the end of its movement in either direction.

5. In a flying shear, upper and lower knives mounted to move about fixed axes, the upper one of said knives being pivoted on a second axis movable about said fixed axis as said knife is moved about said fixed axis, said upper knife being of materially greater width than said lower knife, said lower knife being movable, transversely on its fixed axis, fluid pressure means for moving said lower knife transversely on its fixed axis, means for moving said knives through a partial revolution alternately in opposite directions about said fixed axes, and means for automatically snapping said upper knife about its pivot axis in the direction said knife is being moved about said fixed axis adjacent the end of its movement in either direction.

6. In a flying shear, upper and lower knives mounted to move about fixed axes, the upper one of said knives being pivoted on a second axis movable about said fixed axis as said knife is moved about said fixed axis, said upper knife being of materially greater width than said lower knife, said lower knife being movable transversely on its fixed axis means for moving said lower knife transversely on its fixed axis, means for moving said knives through a partial revolution alternately in opposite directions about said fixed axes, means for automatically snapping said upper knife about its pivot axis in the direction said knife is being moved about said fixed axis adjacent the end of its movement in either direction, and means for limiting the said last named movement of said upper knife.

7. A flying shear comprising, in combination, a base, a pair of housings mounted on said base, upper and lower shear shafts journaled in said housings, a shear knife mounted on said lower shaft and rotatable therewith, hanger arms fixedly mounted on said upper shaft, a pivot shaft journaled in said hanger arms, an upper shear knife fixedly mounted on said pivot shaft, means for rotating said shear shafts through a partial revolution in opposite directions to swing said shear knives through an arcuate path, and means for rotating said pivot shaft relative to and in the direction of travel of said upper shear shaft adjacent the limit of travel of said upper shear shaft in both directions.

8. A flying shear comprising, in combination, a base, a pair of housings mounted on said base, upper and lower shear shafts journaled in said housings, a shear knife mounted on said lower shaft and rotatable therewith, hanger arms fixedly mounted on said upper shaft, a pivot shaft journaled in said hanger arms, an upper shear knife fixedly mounted on said pivot shaft, means for rotating said shear shafts through a partial revolution in opposite directions to swing said shear knives through an arcuate path, and means for automatically snapping said pivot shaft about its axis relative to and in the direction of travel of said upper shaft adjacent the limit of travel of said upper shear shaft in both directions.

9. A flying shear comprising, in combination, a base, a pair of housings mounted on said base, upper and lower shear shafts journaled in said housings, a shear knife mounted on said lower shaft, said lower knife being rotatable with and movable longitudinally relative to said lower shear shaft, means for moving said lower knife longitudinally relative to said lower shaft, hanger arms fixedly mounted on said upper shaft, a pivot shaft journaled in said hanger arms, an upper shear knife fixedly mounted on said pivot shaft, means for rotating said shear shafts through a partial revolution in opposite directions to swing said shear knives through an arcuate path, and means for rotating said pivot shaft relative to and in the direction of travel of said upper shear shaft adjacent the limit of travel of said upper shear shaft in both directions.

10. In a flying shear a pair of shear knives each movable back and forth through partial revolutions about separate vertically spaced fixed axes, means for moving said knives and means for decreasing the distance from the fixed axis about which at least one of said knives is moved and the knife edge after said knives have moved through shearing position, and means for returning the knife to normal cutting position at the end of the operating cycle.

11. A flying shear comprising, in combination, a base, a pair of housings mounted on said base, upper and lower shear shafts journaled in said housings, a shear knife mounted on said lower shaft and rotatable therewith, hanger arms fixedly mounted on said upper shaft, a pivot shaft journaled in said hanger arms, an upper shear knife fixedly mounted on said pivot shaft, means for alternately rotating said shear shafts through a partial revolution in opposite directions, a shaft journaled in said housing above said upper shear shaft and parallel thereto, a lever arm fixedly mounted on said last named shaft, a second lever arm fixedly mounted on said pivot shaft, said first named lever arm being longer than said second named lever arm so as to have a greater throw, and a resilient connection between the free ends of said lever arms, means for rotating said last named shaft simultaneously with the rotation of said shear shafts so as to move said first named lever arm through an arc in opposite directions corresponding to the direction of movement of said upper shear knife, said first named lever being adapted to tension said resilient connection so as to cause said second named lever arm to snap over in the direction of movement of said first named lever arm and said upper shear knife as said lever arm and shear knife approach the limit of their travel in both directions.

12. In a flying shear, a base, a pair of housings mounted on said base, upper and lower shear shafts journaled in said housings, shear blades carried by said shafts, a shear-kicker operating shaft journaled in said housings, a segmental gear on said upper shear shaft, gears connecting said rack and said kicker operating shaft, levers keyed to said shear shafts, connecting rods connected to said levers, and means for reciprocating said rods to oscillate said levers and rotate said shear shafts alternately in opposite direction through a portion of a revolution.

13. In a flying shear, a base, a pair of housings mounted on said base, upper and lower shear shafts journaled in said housings, shear blades carried by said shafts, a shear-kicker operating shaft journaled in said housings, a segmental gear on said upper shear shaft, gears connecting said segmental gear and said kicker operating shaft, levers keyed to said shear shafts, connecting rods connected to said levers, means for reciprocating said rods to oscillate said levers and rotate said shear shafts alternately in opposite direction through a portion of a revolution, said means including a cross-head to which said connecting rods are pivoted, a crank-shaft, a connecting rod connecting said crank-shaft and said cross-head, a gear on said crank-shaft, a rack meshed with said gear, and a fluid pressure motor for reciprocating said rack.

In testimony whereof, we have hereunto set our hands.

BRUCE N. BLETSO.
GEORGE H. ROSE.